United States Patent
Matsuda et al.

(10) Patent No.: US 7,822,563 B2
(45) Date of Patent: Oct. 26, 2010

(54) METHOD AND DEVICE FOR CALCULATING MAGNITUDE OF WHEEL-GENERATED CORNERING FORCE

(75) Inventors: Jun Matsuda, Kanagawa (JP); Tsuyoshi Kitazaki, Kanagawa (JP); Naoshi Miyashita, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 133 days.

(21) Appl. No.: 11/996,249

(22) PCT Filed: Jul. 18, 2006

(86) PCT No.: PCT/JP2006/314174

§ 371 (c)(1),
(2), (4) Date: Jan. 18, 2008

(87) PCT Pub. No.: WO2007/010895

PCT Pub. Date: Jan. 25, 2007

(65) Prior Publication Data

US 2009/0043517 A1 Feb. 12, 2009

(30) Foreign Application Priority Data

Jul. 19, 2005 (JP) ............................. 2005-208603

(51) Int. Cl.
*G01L 1/00* (2006.01)
(52) U.S. Cl. ................... 702/41; 702/105; 702/141; 702/150; 702/155; 701/72; 307/120; 280/124.107; 180/172; 180/197; 73/488

(58) Field of Classification Search .................. 702/41, 702/105, 141, 150, 155; 280/124.107; 307/120; 701/72; 73/488; 180/172, 197
See application file for complete search history.

(56) References Cited

U.S. PATENT DOCUMENTS

| 5,857,687 | A  | * | 1/1999 | Ishii ..................... 280/124.177 |
| 6,438,464 | B1 | * | 8/2002 | Woywod et al. ............... 701/1 |
| 7,359,787 | B2 | * | 4/2008 | Ono et al. ...................... 701/82 |
| 7,406,863 | B2 | * | 8/2008 | Ogawa ......................... 73/146 |

FOREIGN PATENT DOCUMENTS

JP 2004-512207 4/2004
WO WO01/92078 12/2001

* cited by examiner

*Primary Examiner*—Carol S Tsai
*Assistant Examiner*—Elias Desta
(74) *Attorney, Agent, or Firm*—Knobbe Martens Olson & Bear, LLP.

(57) ABSTRACT

A method of calculating a cornering force to be applied to each wheel provided to a vehicle which is cornering, comprising the steps of: obtaining a magnitude of a centrifugal force to the vehicle in a direction substantially orthogonal to a vehicle traveling direction, a contact length of each wheel during the cornering of the vehicle, and an amount of deformation in a wheel width direction at the contact portion of each wheel of the vehicle, calculating a difference between the obtained amount of the deformation and an amount of deformation in the wheel width direction under a straight forward travel condition of the vehicle for each wheel, and calculating a cornering force for each wheel based on the magnitude of the centrifugal force, the contact length, and the difference between amounts of deformation in the wheel width direction.

11 Claims, 10 Drawing Sheets

METHOD AND DEVICE FOR CALCULATING MAGNITUDE OF WHEEL-GENERATED CORNERING FORCE

CROSS REFERENCE TO RELATED APPLICATION

This application claims the benefit and priority to and is a U.S. National Phase of PCT International Application Number PCT/JP2006/314174, filed on Jul. 18, 2006, designating the United States of America, which claims priority under 35 U.S.C. §119 to Japanese Application Number 2005-208603 filed on Jul. 19, 2005. The disclosures of the above-described applications are hereby incorporated by reference in their entirety.

TECHNICAL FIELD

The present invention relates to a cornering force calculating method and a cornering force calculating device for calculating a magnitude of a cornering force generated in each of a plurality of wheels provided to a vehicle when the vehicle is cornering.

BACKGROUND ART

The cornering property is a key factor for the driveability of automobile vehicles. In order to design automobile vehicles capable of achieving higher driveability, it is important to evaluate the cornering property of the automobile vehicle accurately. For an automobile vehicle provided with wheels to which tires are mounted, various factors are involved in its cornering property, including vehicle structure properties (e.g., weight, balance), suspension properties, tire properties, and road surface conditions. When an automobile vehicle is cornering, an equilibrium state is maintained between the sum of the forces (cornering forces) towards the center of the cornering line generated on the contact surfaces of the front and rear tires, and the centrifugal force of the vehicle. The magnitude of the cornering force varies depending on the types of automobile vehicles, the tires, or the traveling conditions. In order to evaluate the cornering property of automobile vehicles, it is significantly important to compare and evaluate the cornering forces under various traveling conditions.

As an example of methods of evaluating the cornering force generated in a specific tire, a method that uses known indoor cornering test devices has been described. In the description of the indoor cornering test devices, for example, a specific tire is made in contact with a simulated road surface with the specific tire being loaded. Then, the specific tire is rotated while moving the virtual road surface and the rotation axis of the specific tire relatively to each other, and the magnitude of the cornering force generated on the contact surface of the specific tire is measured. However, a cornering force generated in a tire of a vehicle is affected by various factors such as vehicle structure properties (e.g., weight balance), suspension properties, tire properties, and road surface conditions as described above. Moreover, during actual traveling of the vehicle, changes in the load applied to the wheel occur more frequently due to changes in, such as, postures of the vehicle. Thus, known indoor cornering test devices have had a limitation in accuracy in reproducing various conditions that the vehicle may encounter after actual mounting of the tire thereon and during actual traveling on the road surface (e.g., condition of load applied to the tire, tire rotating condition). Thus, with such indoor cornering test devices, when a specific tire is actually mounted to a vehicle, accurate measurement of the cornering force generated on a contact surface of the specific tire cannot be determined. On the other hand, as a method of evaluating a cornering force generated in a tire actually mounted to a vehicle, Patent Document 1 describes a system for predicting forces generated in a tire in which a sensor is used to measure a torsional deformation of the side wall of the tire, and a cornering force that may be generated in the tire is estimated based on the measured torsional deformation.

Patent Document 1: JP 2004-512207 A

DISCLOSURE OF THE INVENTION

Problem to be Solved by the Invention

However, according to the system for predicting the forces generated in the tire disclosed in Patent Document 1, it is necessary to obtain in advance a relationship between tire deformation and the forces to be generated at the tire deformation. Obtaining in advance the relationship between tire deformation and forces to be generated at the tire deformation in the system according to Patent Document 1 requires a great deal of work. Further, if the relationship between tire deformation and the forces to be generated at the tire deformation, which is obtained in advance as described above, is used alone, it is impossible to accurately measure the cornering force and the lateral force to be generated on the contact surface of the tire under various conditions associated with the vehicle during when the vehicle is actually traveling on the road surface (load condition applied to the tire or the tire rotation state). In view of the foregoing, it is an object of the present invention to provide a method for accurately calculating with ease a magnitude of a cornering force generated in each of a plurality of wheels actually mounted on a vehicle.

Means for Solving the Problem

To solve the above problem, the invention provides a cornering force calculating method of calculating a magnitude of a cornering force to be applied to each of a plurality of wheels provided to a vehicle when the vehicle is cornering, the plurality of wheels being each assembled with a tire, the cornering force calculating method comprising: a centrifugal force measuring step of measuring a magnitude of a centrifugal force to be applied to the vehicle which is cornering, the centrifugal force being in a direction substantially orthogonal to a vehicle traveling direction; a contact length deriving step of determining a contact length in a wheel circumferential direction, at a contact portion of each of the plurality of wheels of the vehicle which is cornering; a width direction deformation amount deriving step of determining an amount of deformation in a wheel width direction, at the contact portion of each of the plurality of wheels of the vehicle which is cornering; and a cornering force calculating step of calculating a magnitude of a cornering force generated in each of the plurality of wheels provided to the vehicle, based on the magnitude of the centrifugal force, the contact length, and the amount of the deformation in the wheel width direction.

Preferably the method further comprises a width direction deformation deviation calculating step of calculating, prior to the cornering force calculating step, a difference between the amount of the deformation in the wheel width direction during when the vehicle is cornering determined in the width direction deformation amount deriving step and an amount of deformation in the wheel width direction during when the vehicle is traveling straight, for each of the plurality of wheels, wherein: the amount of the deformation in the wheel width direction of the contact portion of each of the plurality of wheels during when the vehicle is traveling straight is determined in advance; and the cornering force calculating step includes calculating a magnitude of a cornering force generated in each of the plurality of wheels, respectively, by using the magnitude of the centrifugal force, the contact length, and the difference between the amounts of the deformation in the wheel width direction.

Preferably, the cornering force calculating step comprises: determining, for each of the plurality of wheels, a deformation area equivalent indicating a deformation area of the contact portion of each of the plurality of wheels during when the vehicle is cornering, the deformation area equivalent being obtained by multiplying the contact length with the difference of the amounts of the deformation in the wheel width direction; and multiplying each ratio of the deformation area equivalent of each of the plurality of wheels with respect to a sum of the deformation area equivalents of the plurality of wheels, with the magnitude of the centrifugal force to calculate, for each of the plurality of wheels, a magnitude of a cornering force generated in the contact portion of each of the plurality of wheels.

The method preferably further comprises an acceleration data acquiring step of acquiring time series acceleration data at a predetermined portion of the tire, the time series acceleration data being generated due to an external force applied from the road surface to the tire in rotation, wherein the contact length deriving step comprises using the time series acceleration data of the tire acquired in the acceleration data acquiring step to determine a contact length of a wheel to which the tire is assembled.

The contact length deriving step preferably comprises: determining displacement data by extracting, from the time series acceleration data, time series acceleration data due to deformation of a tire and by subjecting the time series acceleration data due to deformation of a tire to time integration of second order, to calculate an amount of deformation at a predetermined portion of the tire; and calculating the contact length, by using the amount of deformation at the predetermined portion of the tire.

The time series acceleration data acquired in the acceleration data acquiring step preferably includes at least one of acceleration data in a radial direction which is orthogonal to a circumferential direction of the tire and acceleration data in the circumferential direction of the tire; and an amount of deformation at the predetermined portion of the tire calculated in the contact length deriving step preferably includes one of an amount of deformation in the radial direction and the circumferential direction of the tire and an amount of deformation in the radial direction of the tire.

The method preferably further comprises an acceleration data acquiring step of acquiring time series acceleration data at a predetermined portion of the tire, the time series acceleration data being generated due to an external force applied from the road surface to the tire in rotation, wherein the width direction deformation amount deriving step comprises using the time series acceleration data of the tire acquired in the acceleration data acquiring step to determine the amount of the deformation in the wheel width direction of each of the plurality of wheels.

The width direction deformation amount deriving step preferably comprises: determining displacement data by extracting, from the time series acceleration data, time series acceleration data due to deformation of a tire and by subjecting the time series acceleration data due to deformation of a tire to time integration of second order, to calculate the amount of the deformation in the wheel width direction of the tire.

The method preferably further comprises a vehicle acceleration measuring step of measuring, through a vehicle acceleration sensor provided to the vehicle, a magnitude of acceleration of the vehicle in a direction substantially orthogonal to the vehicle travelling direction during when the vehicle is cornering, wherein the centrifugal force deriving step derives a magnitude of the centrifugal force based on the magnitude of acceleration of the vehicle measured in the vehicle acceleration measuring step and a weight of the vehicle which is determined in advance.

The invention also provides a cornering force calculating device for calculating a magnitude of a cornering force to be applied to each of a plurality of wheels provided to a vehicle when the vehicle is cornering, the plurality of wheels being each assembled with a tire, the cornering force calculating device comprising: a centrifugal force measuring means for measuring a magnitude of a centrifugal force to be applied to the vehicle which is cornering, the centrifugal force being in a direction substantially orthogonal to a vehicle traveling direction; a contact length deriving means for determining a contact length in a wheel circumferential direction, at a contact portion of each of the plurality of wheels of the vehicle which is cornering; a width direction deformation amount deriving means for determining an amount of deformation in a wheel width direction, at the contact portion of each of the plurality of wheels of the vehicle which is cornering; and a cornering force calculating means for calculating a magnitude of a cornering force generated in each of the plurality of wheels provided to the vehicle, based on the measured magnitude of the centrifugal force, the derived contact length, and the amount of the deformation in the wheel width direction.

EFFECTS OF THE INVENTION

According to the cornering force calculating method and the cornering force calculating device of the present invention, it is possible to accurately calculate with ease a magnitude of a cornering force generated in each of a plurality of wheels actually mounted on a vehicle when the vehicle is cornering.

Figure 1:
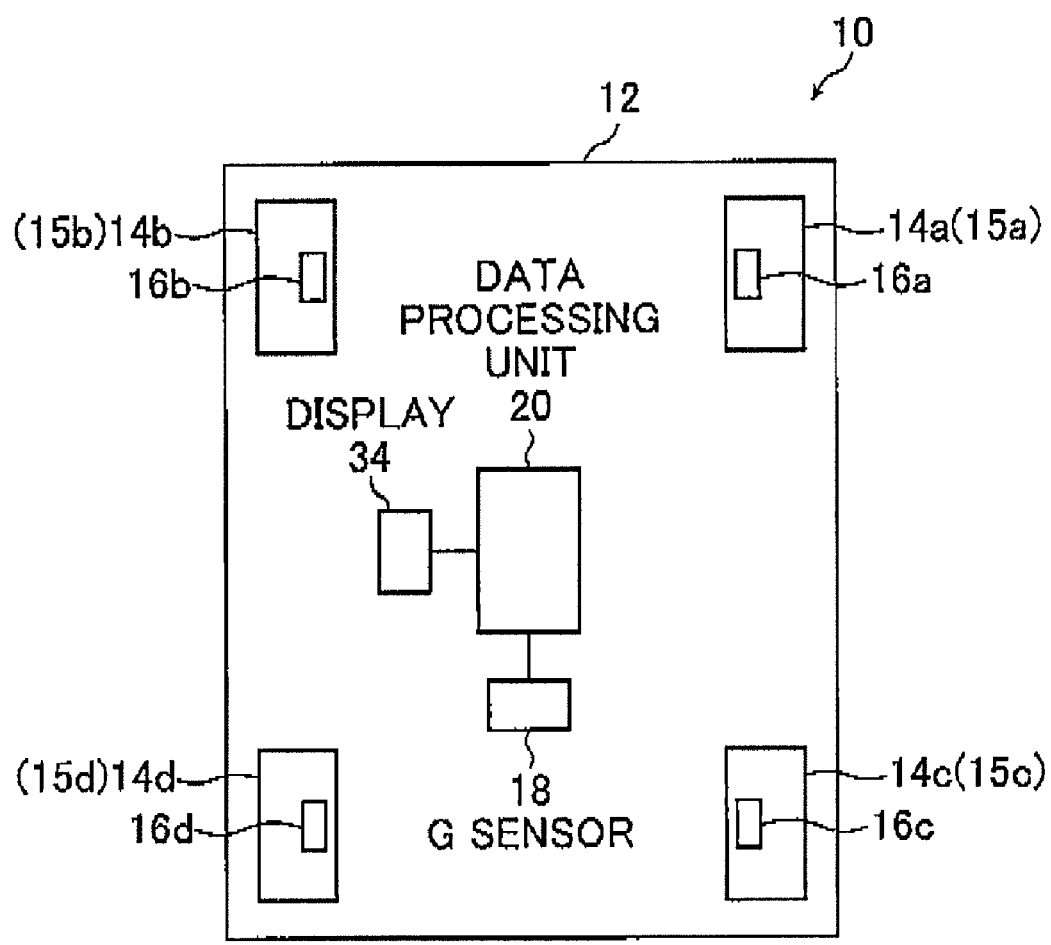
FIG. 1 is a schematic view explaining an example of a cornering force calculating device according to the present invention.

DESCRIPTION OF REFERENCE NUMERAL 2 acceleration sensor
3 receiver
4 amplifier (AMP)
10 cornering force calculating device
12 vehicle
14a to 14d wheel
15a to 15d tire
16a to 16d sensor unit
18 acceleration sensor
21 processing device
22 tire acceleration data acquiring section
23 CPU
24 signal processing section
27 memory
34 display
40 contact length deriving section
50 width direction deformation deviation calculating section
60 centrifugal force deriving section
70 cornering force calculating section signal processing circuit

BEST MODE FOR CARRYING OUT THE INVENTION

A cornering force calculating method and a cornering force calculating device of the present invention will hereinafter be described in detail with reference to a preferred embodiment shown in the accompanying drawings.

FIG. 1 shows a schematic view explaining a cornering force calculating device 10 (hereinafter, referred to as device 10), which is an example of the cornering force calculating device according to the present invention. The device 10 is provided on a vehicle 12 to which four wheels 14a to 14d are mounted. The four wheels 14a to 14d have tires 15a to 15d that are assembled to the wheels 14a to 14d, respectively. All of the tires 15a to 15d are the same in type (same in tire size, tire rim width, belt structure, tire pressure level, or the like). The device 10 includes sensor units 16a to 16d, an acceleration sensor (G sensor) 18, a data processing unit 20, and a display 34. The sensor units 16a to 16d are each provided to the four wheels 14a to 14d, respectively. The sensor units 16a to 16d each acquire acceleration information of a predetermined portion (sensor position) of a tire 15 (representative of the tires 15a to 15d) of each wheels, and transmits the acceleration information in a form of radio signals. The acceleration information is generated due to an external force applied to the tire 15 from a road surface when the vehicle 12 is traveling on the road surface. The G sensor 18 acquires acceleration information at the body center position of the vehicle 12, and transmits the acquired acceleration information to the data processing unit 20. The data processing unit 20 receives the respective radio signals transmitted from the sensor units 16a to 16d. Then, the data processing unit 20 extracts, from each of the received radio signals, deformation acceleration information in a wheel radial direction and deformation acceleration information in a wheel width direction of each wheel, at the sensor position in each tire 15 of each wheel. After that, the data processing unit 20 derives a contact length of each wheel based on the extracted deformation acceleration information in the wheel radial direction. The data processing unit 20 also derives an amount of width direction deformation or a width direction deformation deviation of each wheel, based on the extracted deformation acceleration information in the wheel width direction. The amount of width direction deformation and the width direction deformation deviation will be described later in detail. The data processing unit 20 further derives, based on the acceleration information at the body center position of the vehicle 12 received from the G sensor 18, a magnitude of a centrifugal force applied to the vehicle 12, which acts in a substantially orthogonal direction with respect to the traveling direction of the vehicle 12. The data processing unit 20 then calculates a magnitude of a cornering force generated in each wheel, based on the derived contact length, the derived amount of width direction deformation of each wheel, and the derived centrifugal force applied to the vehicle 12. The display 34 displays the contact length, the amount of width direction deformation, the centrifugal force, which are derived by the data processing unit 20, and a calculation result of a cornering force generated in each of the wheels 14a to 14d. A memory 27 stores in advance data on the weight of the vehicle 12, and data on the amount of width direction deformation of a tire tread portion at a contact portion of each wheel when the vehicle 12 is traveling straight. While in the example shown in FIG. 1, the data processing unit 20 is arranged on the vehicle 12, the data processing unit 20 may be configured as portable, and is not limited to the arrangement on the vehicle 12.

Figure 2:
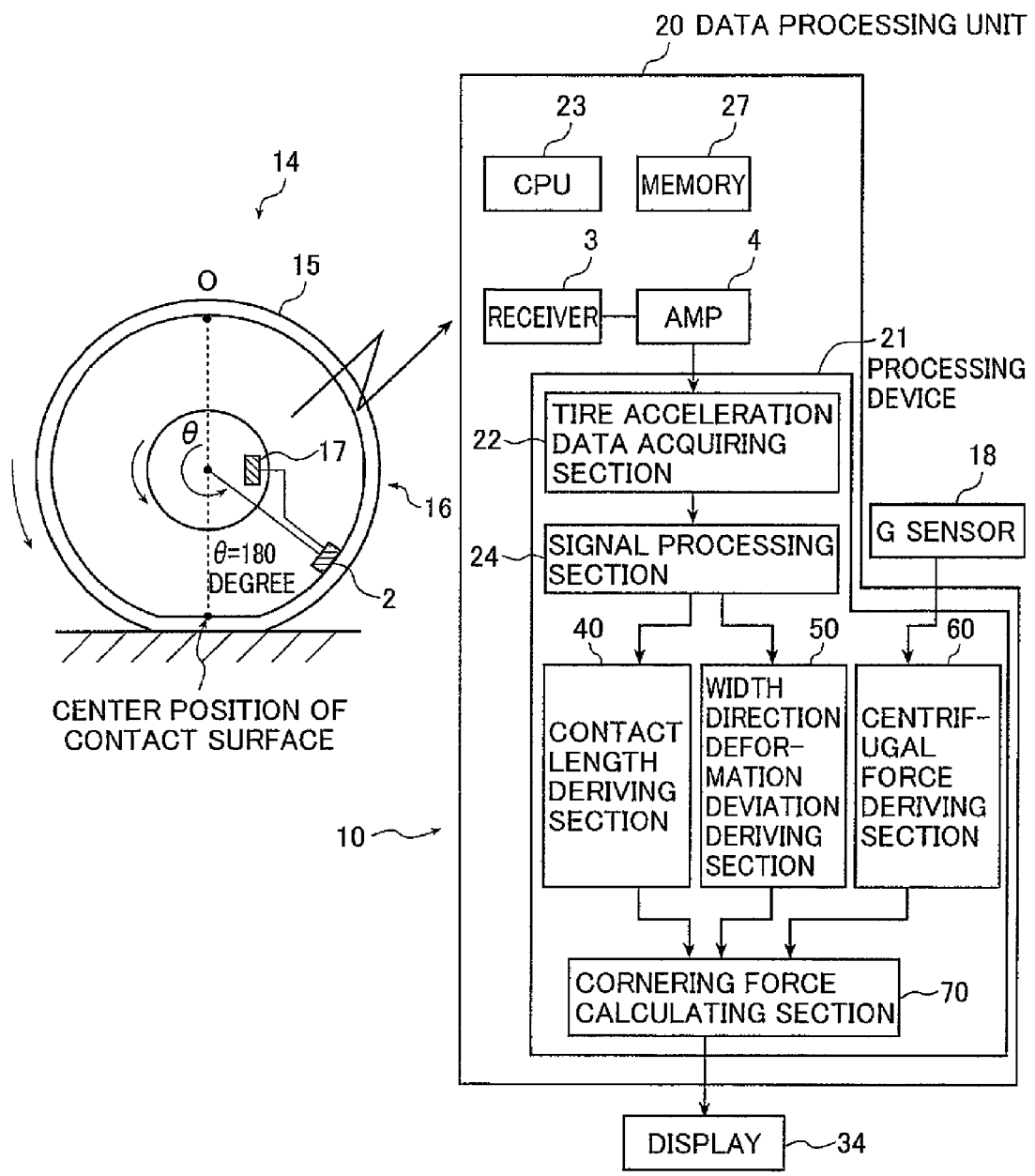
FIG. 2 is a diagram explaining a sensor unit and a data processing unit of the cornering force calculating device shown in FIG. 1.

FIG. 2 is a diagram illustrating the sensor unit 16 (sensor unit 16a), the G sensor 18, and the data processing unit 20 of the cornering force calculating device 10 shown in FIG. 1. All the sensor units 16a to 16d are the same in configuration, and therefore only the sensor unit 16a and the wheel 14a to which the sensor unit 16a is provided are shown in the drawing. The data processing unit 20 includes a receiver 3, an amplifier (AMP) 4a, processing means 21, a CPU 23, and the memory 27. The data processing unit 20 is a computer in which the CPU 23 executes programs stored in the memory 27 to allow each section included in the processing means 21 to function. The memory 27 stores in advance a value for a vehicle weight M which has been input through an input means or the like, which is not shown, and data on an amount of width direction deformation of the tire tread portion at each contact portion of each wheel when the vehicle 12 is traveling straight.

The processing means 21 includes a tire acceleration data acquiring section 22, a signal processing section 24, a contact length deriving section 40, a width direction deformation deviation deriving section (deformation deviation deriving section) 50, a centrifugal force deriving section 60, and a cornering force calculating section 70. The tire acceleration data acquiring section 22 acquires measurement data of acceleration in a wheel radial direction and measurement data on acceleration in a wheel width direction at the tread portion (more specifically, the sensor position of the tread portion) of each of the tires 15a to 15d forming the wheels 14a to 14d, respectively. The signal processing unit 24 carries out signal processing with respect to the acceleration data in the radial direction and the acceleration data in the width direction thus acquired. Then, the contact length deriving section 40 derives, by using the above-mentioned acceleration data in the radial direction, a contact length of each of the wheels 14a to 14d. The deformation deviation deriving section 50 calculates, by using the above-mentioned acceleration data in the width direction, an amount of width direction deformation at each contact portion of each of the wheels 14a to 14d. As described above, the memory 27 stores in advance the amount of width direction deformation at the tire tread portion of each contact portion of each of the wheels when the vehicle 12 is traveling straight. The width direction deformation deviation deriving section 50 derives a width direction deformation deviation of each of the wheels 14a to 14d. The width direction deformation deviation refers to a deviation (difference) between the amount of width direction deformation during the straight traveling which is stored in advance, and the amount of width direction deformation calculated by using the above-mentioned width direction acceleration data. The centrifugal force deriving section 60 derives, by using the weight data of the vehicle 12 stored in the memory 27 in advance and the above-mentioned acceleration data at the body center position of the vehicle 12, a magnitude of a centrifugal force applied to the vehicle 12. The cornering force calculating section 70 calculates a magnitude of a cornering force generated on a contact surface of each of the wheels 14a to 14d, by using the above-mentioned contact length derived by the contact length deriving section 40, the above-mentioned width direction deformation deviation derived by the width direction deformation deviation deriving section 50, and the above-mentioned magnitude of the centrifugal force derived by the centrifugal force deriving section 60. The function of each of the means will be described later in detail.

Figure 3A:
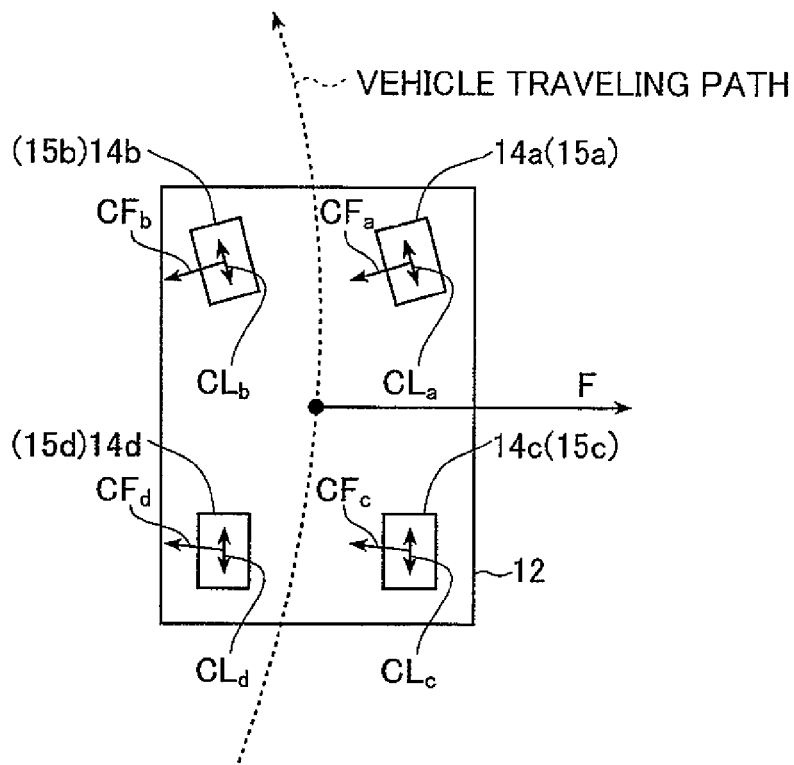
FIGS. 3(a) and 3(b) are diagrams explaining forces applied to a vehicle or a wheel when the vehicle is cornering.
Figure 3B:
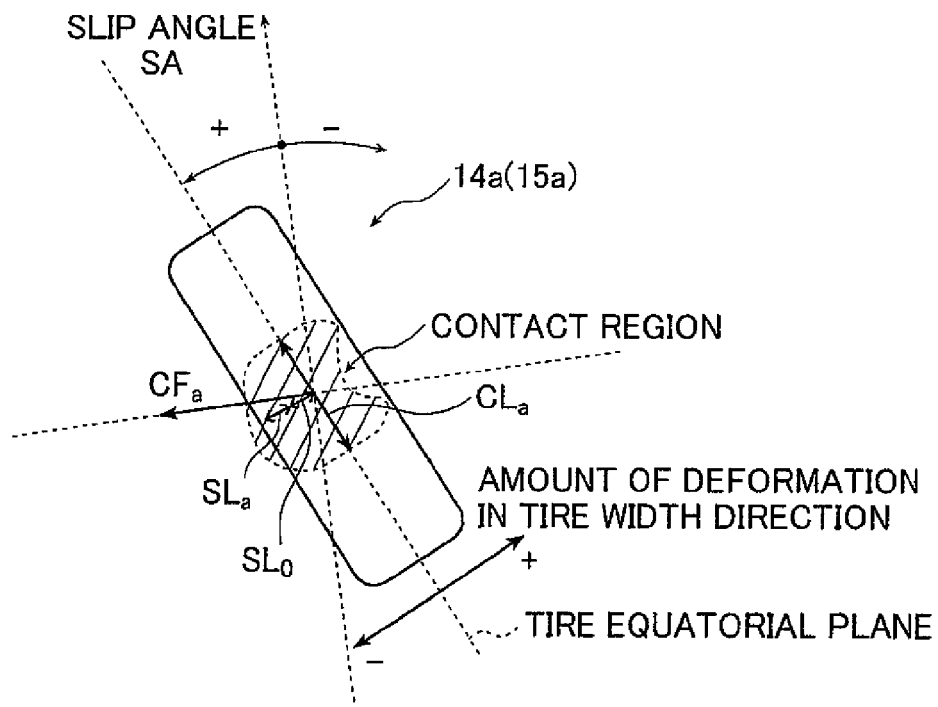

The present invention has such a feature that a magnitude of a cornering force generated at a contact portion of each of the wheels 14a to 14d (contact portion of each of the tires 15a to 15d) is calculated, by using the contact length of each of the wheels 14a to 14d (contact length of each of the tires 15a to 15d), the width direction deformation deviation of each of the wheels 14a to 14d, and a magnitude of the centrifugal force applied to the vehicle 12. According to the present invention, it is possible to accurately calculate with ease a magnitude of a cornering force generated at a contact portion of each of the wheels 14a to 14d. Hereinbelow, the present invention will be described with reference to an exemplary case where the vehicle 12 is cornering. FIGS. 3(a) and 3(b) are schematic diagrams illustrating forces to be applied to the vehicle 12 and to the contact portion of each of the wheels 14a to 14d, when the vehicle 12 is cornering. FIG. 3(a) is a schematic diagram illustrating a centrifugal force to be applied to the vehicle 12 which is cornering, and a cornering force generated in the contact portion of each of the wheels 14a to 14d of the vehicle 12. Also, FIG. 3(b) is an enlarged view illustrating one of the wheels (the wheel 14a) of the vehicle 12, the wheel 14a being seen from the road surface side.

As shown in FIG. 3(a), when the vehicle is cornering, the vehicle 12 is applied with a centrifugal force F which acts in a direction of pushing the vehicle 12 outward of the corner, and cornering forces ($CF_a$ to $CF_d$) each for acting against the centrifugal force F are generated at each of the contact portions of the wheels 14a to 14d of the vehicle 12. During the cornering, an equilibrium state is established between the centrifugal force F and the total sum of the cornering forces $CF_a$ to $CF_d$ generated in the wheels 14a to 14d ($F=CF_a+CF_b+CF_c+CF_d$ is established). With reference to FIG. 3(b), a schematic description will be given of forces to be applied to, for example, a contact portion of the wheel 14a, which is a right front wheel during cornering. The wheel 14a is rotating on a road surface while the tire 15a is in contact with the road surface as illustrated in FIG. 3(b), in which a hatched portion corresponds to the contact portion. During when the vehicle is cornering, the contact length of the tire 15 at an intersection of the tire equatorial plane and the road surface is $CL_a$. During the cornering, the equatorial plane of the tire 15a forming the wheel 14a has an angle (slip angle SA) with respect to the traveling direction of the vehicle. It should be noted that the wheel 14a of the vehicle 12 has a tread portion deformed in a width direction of the tire by $SL_0$ as shown in FIG. 3(b) even during when the vehicle 12 is traveling straight (SA=0°). It is generally known that the tread portion of the tire of the wheel is deformed in the width direction at a contact portion of the wheel even during when the vehicle is traveling straight. The tread portion of the tire 15a further deforms greatly in the width direction by $SL_a$ when the vehicle 12 is cornering.

That is, the wheel 14a slidingly rotates, and the tire equatorial plane maintains the slip angle SA with respect to the traveling direction of the vehicle 12. Focusing attention on a tire in the above-mentioned rotational state, if the contact portion of the tire is seen from a coordinate system fixed to the tire, the road surface moves backward, while the tread surface of the tire is brought into contact with the road surface at the leading edge of the contact portion, and then is moved in the side back direction (downward direction in FIG. 3(b)) with the passage of time, while maintaining contact (adhesion) with the road surface. In this state, the tread surface of the tire is pushed by the road surface in a lateral direction, leading to the shear deformation in the tread portion. Due to the shear deformation in the tread portion, a cornering force, F which is substantially vertical to the vehicle traveling direction, is generated in the tire in the rotational state as described above. Meanwhile, the magnitude of the shear deformation increases as the tread portion moves backward of the contact portion, and the tire starts sliding at a point where a deformation force and a friction force between the tread portion and the road surface become equal to each other. Further, beyond the above-mentioned point, the tread portion slides, leading to the generation of a sliding friction force. Then, the tread portion is restored to its original state (in which there is no deformation) at the trailing edge of the contact portion. As is apparent from the above-mentioned behavior of a tire when the vehicle is cornering, the magnitude of the cornering force generated in the tire during cornering significantly depends on the area of the deformation of the tread portion. Further, the area of the deformation of the tread portion significantly depends on the contact length of a tire (the contact length $CL_a$ in the case of the wheel 14a), an amount of tire width direction deformation of the tread portion of the tire at the contact portion, the width direction deformation deviation at the predetermined portion ($SL_a$ shown in FIG. 3(b) in the case of the wheel 14a), or the like.

Figure 4:
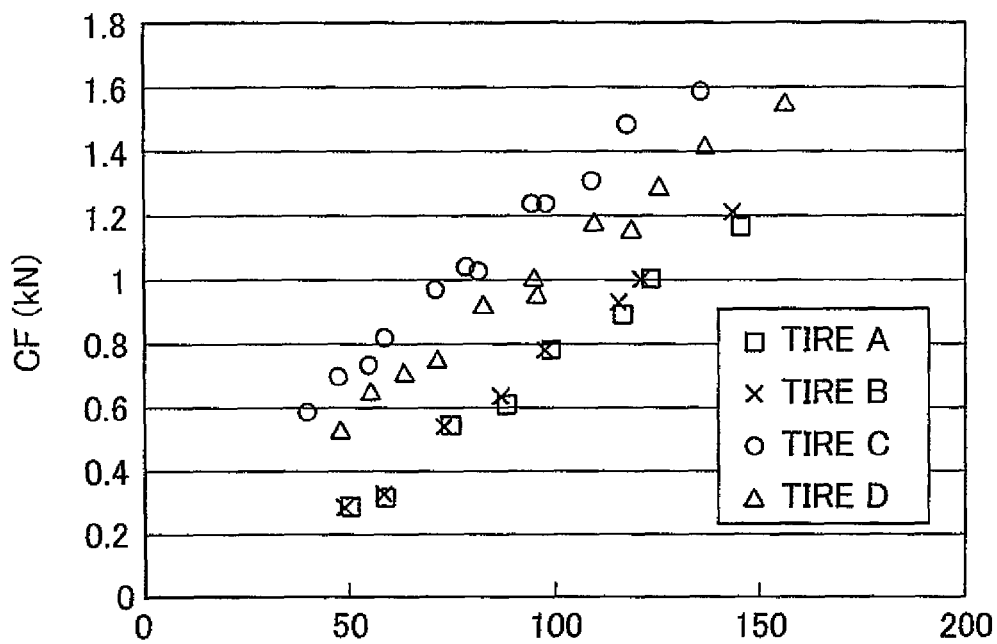
FIG. 4 is a graph showing relationship between a magnitude of a contact load applied to a tread portion of a tire, a slip angle SA, and a cornering force CF.

Based on the above-mentioned point of view, the inventors of the present invention have made a close study as follows of the relationship between the tire contact length during cornering and the amount of tire width direction deformation and the width direction deformation deviation, and the cornering force generated in the tire. The present invention has been made based on novel findings which have been firstly obtained from the close study made by the inventors. FIG. 4 is a graph showing relationship between a magnitude of a contact load applied to the tread portion of a tire assembled to a wheel, a slip angle SA formed by the tire with respect to the road surface, and a cornering force CF, as measured by an indoor test device. Specifically, the graph shown in FIG. 4 is created based on the measurement results of cornering forces generated in four tires A to D when the tires are each set against a road surface (tire contact surface in the cornering test device) by a set load and rotated. In particular, the slip angle of each of the tires is variously changed so as to reproduce the cornering at each of the various slip angles SA, and a magnitude of the cornering force generated in each of the tires is measured, based on which the graph is created. It should be noted that each data item shown in the graph of FIG. 4 includes data obtained in a state where the slip angle and the cornering force CF are proportional to each other (CP region) under each of a plurality of set load conditions. In other words, each data item shown in the graph of FIG. 4 is obtained in a state where the slip angle SA is relatively small in each of the tires. At this time, a load to be applied to the four tires A to D is also variously changed so as to variously change the slip angle in accordance with each of the various load conditions, to thereby measure a cornering force. In FIG. 4, a value obtained by multiplying a contact load applied to each of the tires with a slip angle is on the horizontal axis, and the measured cornering force CF (kN) is on the vertical axis. The four tires A to D are different from each other in tire structure, in terms of tire size, tire rim width, and belt structure.

Figure 5:
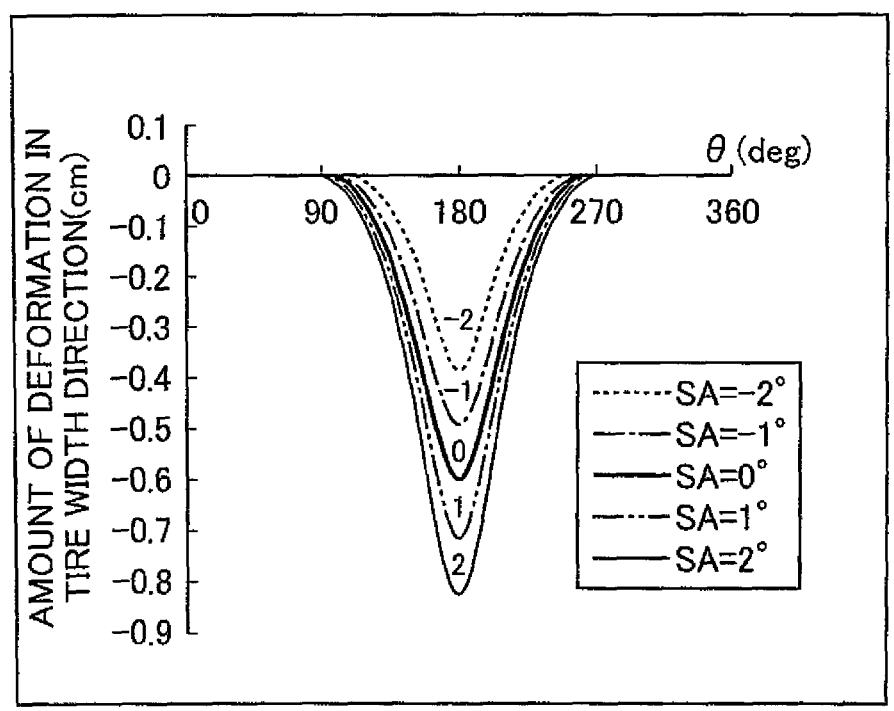
FIG. 5 is a graph showing relationship between a width direction deformation deviation of a tire and a slip angle SA.
Figure 6:
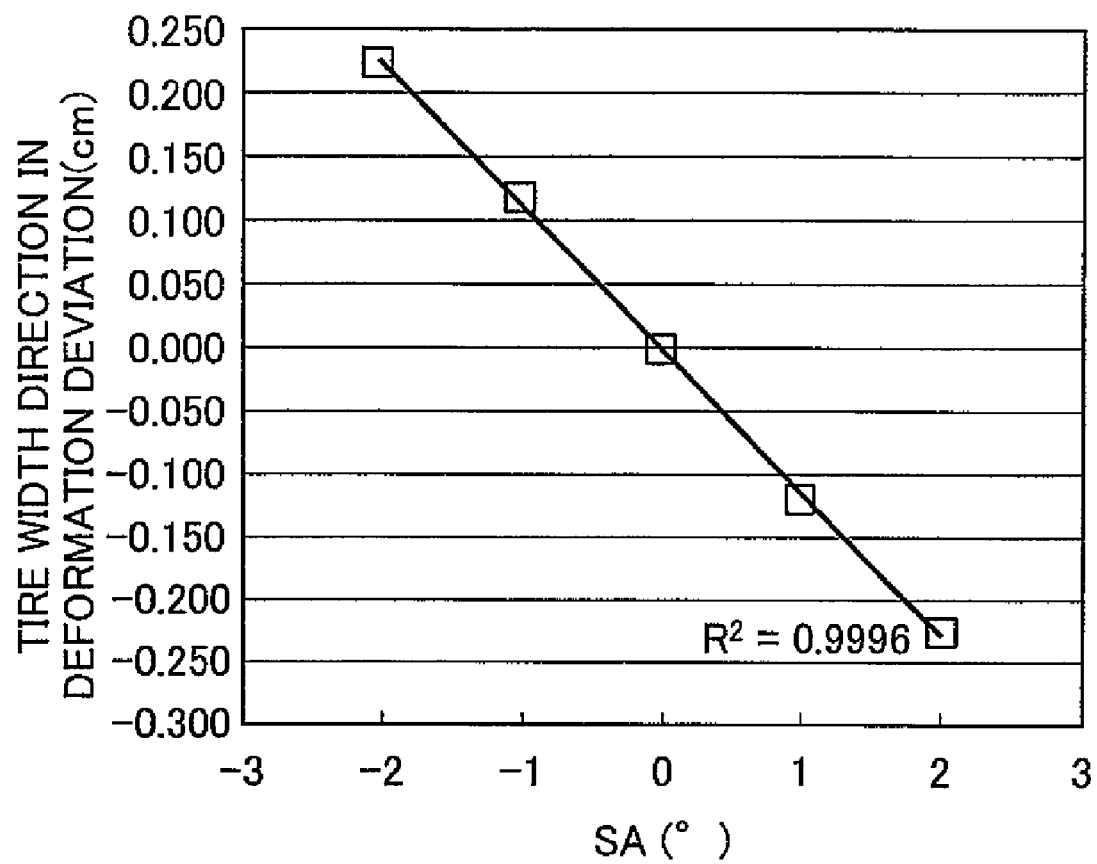
FIG. 6 is a graph showing a correspondence between a slip angle SA and a deformation deviation in a tire width direction in each of various cases where cornering is reproduced at various slip angles SA.

It is generally well known that the contact load applied to a tire and a contact length of the tire are in a proportional relationship. FIG. 5 is a graph showing relationship between an amount of tire width direction deformation and a magnitude of the slip angle SA. The graph shown in FIG. 5 is created based on an amount of tire width direction deformation calculated from an acceleration in a width direction of the tire tread portion measured by an acceleration sensor provided to a tread region of the tire, which is similar to a procedure of calculating an amount of tire width direction deformation in the vehicle 12 to be described later. The angle θ on the horizontal axis of FIG. 5 corresponds to the angle θ shown in FIG. 2. When θ=180°, the acceleration sensor provided to a predetermined portion (sensor position) of the tread portion is located in the vicinity of the center position of the contact portion, where the amount of deformation in the tire width direction reaches its maximum. As shown in FIG. 5, when the slip angle SA increases in the + (plus) direction shown in FIG. 3(b), the amount of width direction deformation monotonously increases in the − (minus) direction shown in FIG. 3(b) in accordance with the increase of the slip angle SA in the plus direction. At this time, in the wheel 14a of the vehicle 12, even when the vehicle 12 is traveling straight (SA=0°), the tread portion of the tire is deformed in the width direction by $SL_0$ shown in FIG. 3(b), at the contact portion. FIG. 6 is a scatter diagram illustrating a correspondence between the slip angle SA and the amount of width direction deformation deviation SL, which have been obtained from the relationship between the slip angle SA and the width direction deformation shown in FIG. 5. As is apparent from FIG. 6, the slip angle SA and the width direction deformation deviation SL show a strong correlation (correlation function $R^2$=0.9996). That is, the slip angle SA and the tire width direction deformation deviation SL are proportional to each other.

As shown in FIG. 4, the contact load×the slip angle SA is proportional to the cornering force CF. As described above, the contact length is proportional to the contact load, and the width direction deformation deviation is proportional to the slip angle SA. The cornering force CF generated in each of the tires is also proportional to a product of the contact length, which is proportional to the contact load, and the width direction deformation deviation, which is proportional to the slip angle SA (the contact length×the width direction deformation deviation). Then, as is apparent from FIG. 3(b), the contact length×the width direction deformation deviation of each of the wheels during cornering also exhibits a degree of the deformation area at the contact portion of each of the wheels during cornering (which is a deformation area equivalent). As described above, in every tire, the contact length×the width direction deformation deviation is proportional to the cornering force CF of the tire (in linear relationship), regardless of the tire size, the tire rim width, the belt structure, or the tire pressure level. In other words, the tire cornering force CF has linear relationship with the contact length×the width direction deformation deviation, irrespective of the types of each tire, and the cornering force CF of each tire is determined according to the contact length×the width direction deformation deviation. The above-mentioned proportional relationship between the contact length×the width direction deformation deviation and the cornering force CF of a tire is particularly prominent (shows a strong correlation) in a state where the slip angle and the cornering force CF are proportional to each other (in a CP region). The findings as described above have been firstly confirmed by the inventors of the present invention.

The tires 15a to 15d assembled to the four wheels 14a to 14d, respectively, the four wheels 14a to 14d being provided to the vehicle 12, are of the same type (substantially the same in tire size, tire rim width, belt structure, and tire pressure level). In the case where a plurality of wheels provided to a vehicle are of the same type, the cornering forces $CF_a$ to $CF_d$ generated in the wheels are each determined by the contact length×the width direction deformation deviation of each of the wheels 14a to 14d.

As described thus far, the cornering forces $CF_a$ to $CF_d$ each act against the centrifugal force which is applied to the vehicle 12, and an equilibrium state is established between the centrifugal force F and the total sum of the cornering forces (total sum of $CF_a$ to $CF_d$) ($F=CF_a+CF_b+CF_c+CF_d$ is established). As described above, the magnitude of each of the cornering forces $CF_a$ to $CF_d$ generated in each of the wheels 14a to 14d (each of the tires 15a to 15d assembled to the wheels), respectively, corresponds to a magnitude of a product (the contact length×the width direction deformation deviation) of each of the contact lengths $CL_a$ to $CL_d$ of the wheels 14a to 14d and each of the width direction deformation deviations $SL_a$ to $SL_d$ of the wheels (which are not shown other than $SL_a$). In other words, each of the cornering forces $CF_a$ to $CF_d$ generated in each of the wheels can be obtained through the following expressions (1-1) to (1-4), by using a ratio of the contact length×the width direction deformation deviation in each of the wheels (four wheels 14a to 14d) with respect to the total sum of the contact length×the width direction deformation deviation of each of the wheels and the magnitude F of the centrifugal force.

[Expression 1]

$$CF_a = \frac{SL_a \times CL_a}{\sum_i (SL_i \times CL_i)} \times F \quad (1\text{-}1)$$

$$CF_b = \frac{SL_b \times CL_b}{\sum_i (SL_i \times CL_i)} \times F \quad (1\text{-}2)$$

$$CF_c = \frac{SL_c \times CL_c}{\sum_i (SL_i \times CL_i)} \times F \quad (1\text{-}3)$$

$$CF_d = \frac{SL_d \times CL_d}{\sum_i (SL_i \times CL_i)} \times F \quad (1\text{-}4)$$

According to the present invention, it is possible to highly accurately calculate with ease a magnitude of a cornering force generated at a contact portion of each of the wheels 14a to 14d. The processing means 21 shown in FIG. 2 calculates the contact lengths $CL_a$ to $CL_d$ and the width direction deformation deviation $SL_a$ to $SA_d$ of the wheels 14a to 14d (the tires 15a to 15d assembled to the wheels), which are necessary to calculate the cornering forces $CF_a$ to $CF_d$ as described above, based on measurement data on acceleration obtained at a predetermined portion (sensor position) of each of the tires 15a to 15d during when the vehicle is cornering. The measurement data on acceleration, which is used in this case, includes data which has been detected by an acceleration sensor 2 of each of the transmission units 16a to 16d provided to each of the wheels to be transmitted from a transmitter 17 of each of the transmission units 16a to 16d to the receiver 3, and amplified by the amplifier 4. Alternatively, the transmitter 17 may not be provided, and, for example, the acceleration sensor 2 may be additionally provided with a transmission function, such that the data may be transmitted from the acceleration sensor 2 to the receiver 3. The transmitter 17 provided to each of the wheels 14a to 14d has identification information (ID) for making identification thereof possible, and the transmitter 17 transmits the ID together with the measurement data of acceleration measured by the corresponding acceleration sensor.

The acceleration sensor 2 is exemplified by a semiconductor acceleration sensor, for example, disclosed in Japanese Patent Application No. 2003-134727 filed by the applicant of the present invention. The semiconductor acceleration sensor includes, specifically, an Si wafer having a diaphragm formed inside the outer peripheral frame portion of the Si wafer, and a pedestal for fixing the outer peripheral frame portion of the Si wafer. A weight is provided at the center part of one surface of the diaphragm, and a plurality of piezoresistors are formed on the diaphragm. When acceleration is applied to this semiconductor acceleration sensor, the diaphragm is deformed to cause the resistance values of the piezoresistors to change. In order to detect such changes as acceleration information, a bridge circuit is formed. The acceleration sensor is fixed to the tire inner surface portion so as to allow measurement of at least acceleration in the tire radial direction and acceleration in the tire width direction, to thereby make it possible to measure acceleration which acts on the tread portion during tire rotation. Other sensors may be used as the acceleration sensor 2, including acceleration pickups that use piezoelectric elements, or distortion gauge type acceleration pickups that incorporate distortion gauges.

The processing means 21 includes, as described above, the tire acceleration data acquiring section 22, the signal processing section 24, the contact length deriving section 40, the width direction deformation deviation deriving section 50, the centrifugal force deriving section 60, and the cornering force calculating section 70. The tire acceleration data acquiring section 22 acquires, as input data, the measurement data of acceleration for at least one tire rotation, which has been amplified by the amplifier 4. The tire acceleration data acquiring section 22 acquires acceleration in the tire radial direction and acceleration in the tire width direction, respectively. The data supplied from the amplifier 4 is analog data. The tire acceleration data acquiring section 22 converts each of the acceleration in the tire radial direction and the acceleration data in the tire width direction into digital data by sampling each of the data at a predetermined frequency. The data acquiring section 22 uses the ID transmitted from each transmitter 15 as described above, to determine which one of the tires (which one of the wheels 14a to 14d) the received measurement data of acceleration is associated with. Once each associated wheel is determined, each of the processes in the signal processing section 24, the contact length deriving section 40, and the width direction deformation deviation deriving section 50 is performed in parallel on each measurement data of each tire of each wheel.

The signal processing section 24 is employed as a unit for extracting time series data of acceleration due to the tire deformation, from the digital acceleration data in the tire radial direction and the digital acceleration data in the tire width direction. The signal processing unit 24 carries out smoothing processing of the measurement data of acceleration, and calculates an approximation curve with respect to the smoothed signals so as to obtain a background component 1. Then, the background component 1 is removed from the measurement data of acceleration that has been subjected to the smoothing processing, so that the time series data of acceleration (each of the acceleration in the tire radial direction and the acceleration data in the tire width direction) due to the tire deformation is extracted. The extracted time series data of acceleration in the tire radial direction due to the tire deformation is transmitted to the contact length deriving section 40. Also, the extracted time series data of acceleration in the tire width direction due to the tire deformation is transmitted to the width direction deriving section 50. Specific processing in the signal processing section 24 will be described later.

The contact length deriving section 40 first subjects the extracted time series data of acceleration in the tire radial direction due to tire deformation to time integration of second order so as to obtain displacement data, to thereby calculate an amount of deformation in the tire radial direction. Specifically, the time series data of acceleration in the tire radial direction due to tire deformation is subjected to integration of second order with respect to time. After that, an approximation curve on the data obtained through the integration of second order is calculated, to thereby obtain a background component 2. The obtained background component 2 is removed from the displacement data obtained through the integration of second order, to thereby calculate the amount of tire deformation in the tire radial direction. After that, the contact length deriving section 40 further subjects the data on the amount of tire deformation in the tire radial direction thus calculated to differentiation of second order with respect to time, to thereby calculate data on acceleration due to tire deformation, that is, time series data of acceleration due to the amount of tire deformation which does not include noise component. Specific processing will be described later. Then, based on the calculated amount of tire deformation and the time series data of acceleration due to tire deformation, a contact length of each tire assembled to each of the wheels 14a to 14d is calculated. The calculated information on the contact length of each tire is output to the cornering force calculating section 70.

The width direction deformation deviation deriving section 50 first subjects the extracted time series data of acceleration in the tire width direction due to tire deformation to time integration of second order so as to obtain displacement data, to thereby calculate a deformation in the tire width direction. Specifically, similarly to the process in the contact length deriving section 40, the time series data of acceleration in the tire width direction due to tire deformation is subjected to integration of second order with respect to time. After that, an approximation curve on the data obtained through the integration of second order is calculated, to thereby obtain a background component 2. The obtained background component 2 is removed from the displacement data obtained through the integration of second order, to thereby calculate the amount of tire deformation in the tire width direction. Then, by using the width direction deformation of each wheel in the case where the vehicle 12 is traveling straight (in a case where the slip angle SA is 0°), which is stored in the memory 27 in advance, a difference (amount of width direction deformation deviation) between the calculated amount of width direction deformation of each wheel and the amount of width direction deformation of each wheel in the case where the SA is 0° is derived. The derived information on the amount of width direction deformation deviation of each wheel is output to the cornering force calculating section 70.

The centrifugal force deriving section 60 receives time series data of acceleration at a body center position of the vehicle 12, from the G sensor 18, and derives a magnitude of a centrifugal force to be applied to the vehicle 12 during cornering, by using the time series data on acceleration at the body center position of the vehicle 12 and the information on weight (mass weight) of the vehicle 12 stored in the memory 27 in advance.

In the processing device 21, as described above, the contact lengths $CL_a$ to $CL_d$ of the wheels 14a to 14d are derived in the contact length deriving section 40, and the amount of width direction deformation deviation $SL_a$ to $SL_d$ of the wheels 14a to 14d in the width direction deformation deviation deriving section 50. Also, the centrifugal force deriving section 60 derives the centrifugal force F to be applied to the vehicle 12. Then, the cornering force calculating section 70 calculates, for each wheel, a magnitude of a cornering force to be generated in each of the contact portions of the wheels 14a to 14d, by using the above-mentioned expressions (1-1) to (1-4). Each calculated value for the magnitude of the cornering force to be generated in each of the wheels is displayed on the display 34.

The display 34 is a known image display means for outputting, by displaying, a magnitude of a cornering force generated in each of the wheels 14a to 14d, which has been calculated in the cornering force calculating section 70. Information to be displayed by the display 34 is not limited to the magnitude of the cornering force generated in each of the wheels calculated in the cornering force calculating section 70, and various data items or a calculation result to be handled in the processing unit 21, such as a waveform of the acquired acceleration data or calculated various parameters, may also be displayed in succession.

Figure 7:
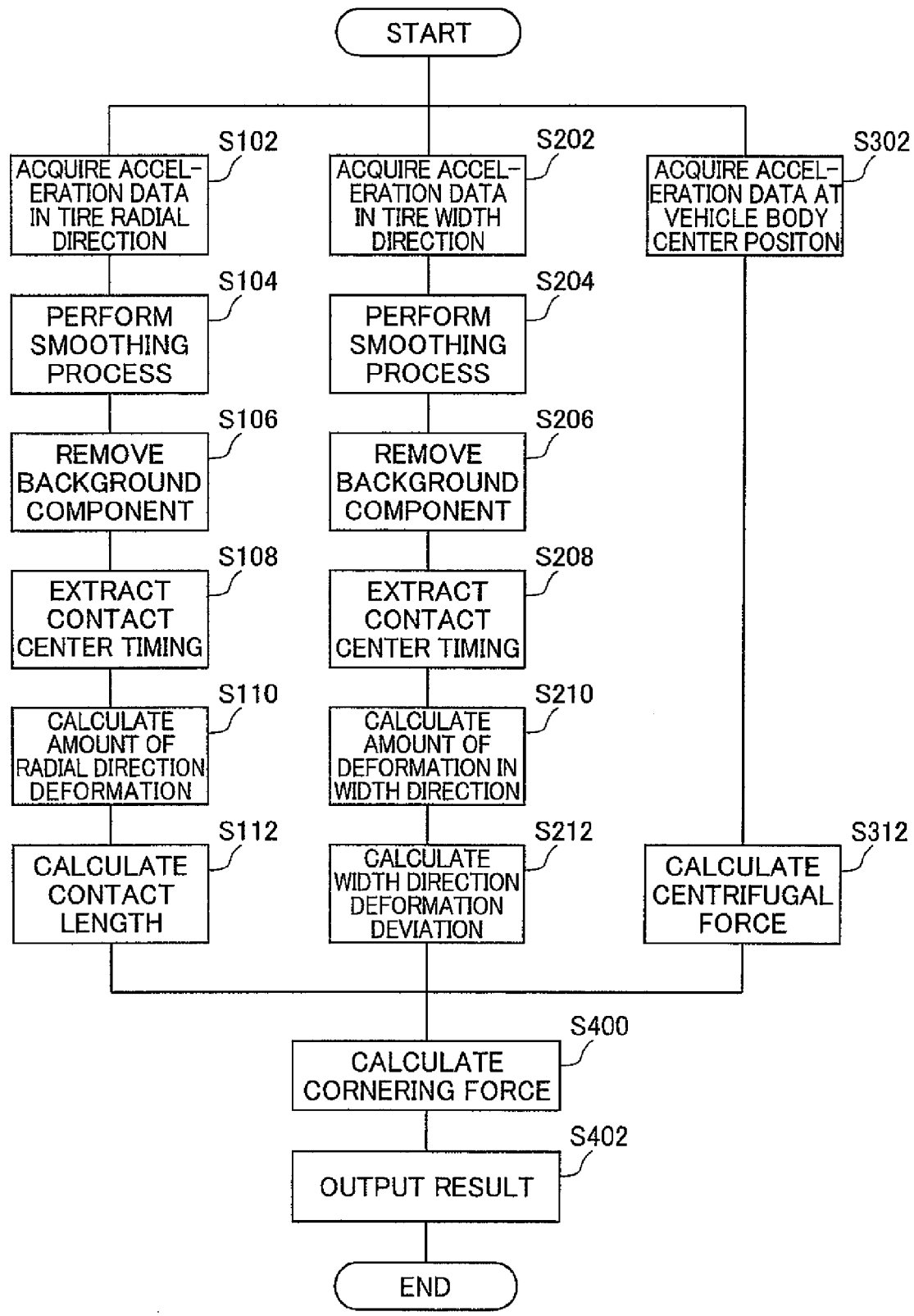
FIG. 7 is a flow chart of a cornering force calculating method according to the present invention.

FIG. 7 is a flow chart of an example of the cornering force calculating method according the present invention, which is implemented in the device 10 described above. FIGS. 8 to 11 are graphs showing results obtained in the processes in the device 10. The results shown in FIGS. 8 to 11 all include processing results on acceleration data in the tire radial direction measured by the acceleration sensor 2. Hereinafter, the cornering force calculating method according to the present invention, which is implemented in the device 10, will be described in detail.

Figure 8A:
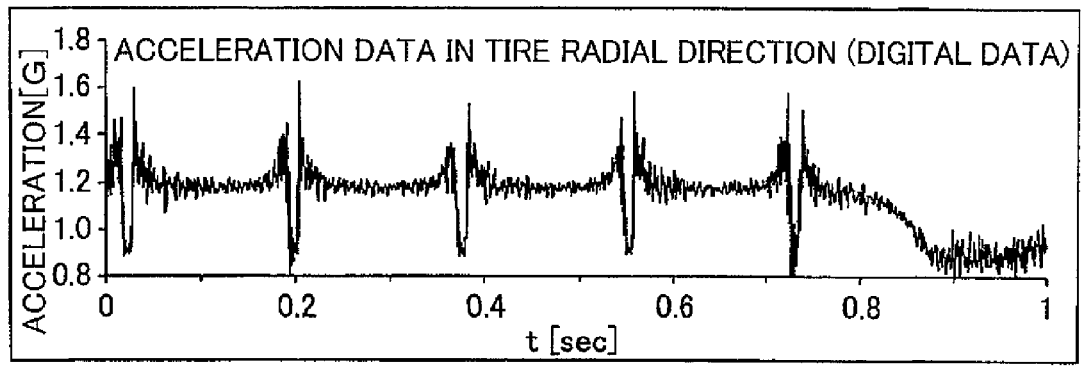
FIGS. 8(a) to 8(c) are graphs showing signal waveforms obtained by the cornering force calculating method according to the present invention.

First, how to calculate the contact length in each of the wheels 14a to 14d will be described in detail. First, the measurement data of acceleration in the tire radial direction of each of the wheels, which has been amplified by the amplifier 4, is supplied to the data acquiring section 22, and sampled at a predetermined sampling frequency, so as to be obtained as digital measurement data as shown in FIG. 8(a) (Step S102). At this time, the data acquiring section 22 uses the above-mentioned ID transmitted from each transmitter 15 as described above, to determine which one of the tires (which one of the wheels 14a to 14d) the received measurement data of acceleration is associated with.

Figure 8B:
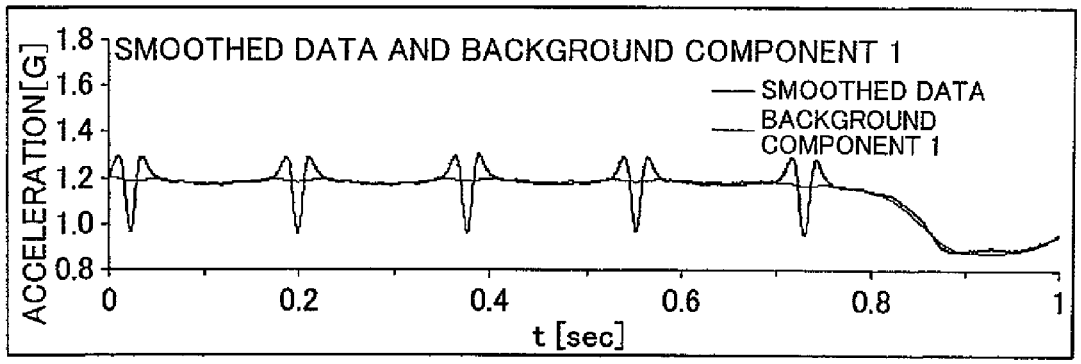

Next, the acquired measurement data is supplied to the signal processing section 24, and first subjected to smoothing processing with a filter (Step S104). As shown in FIG. 8(a), the measurement data (measurement data of acceleration in the tire radial direction) supplied to the signal processing section 24 contains a lot of noise components. When the measurement data is subjected to smoothing processing, the data is obtained as smoothed data as shown in FIG. 8(b). An example of the filter to be used includes, for example, a digital filter that assumes a certain frequency as a cut-off frequency. The cut-off frequency changes depending on rotation speeds or noise components. For example, if the rotation speed is 60 (km/h), the cut-off frequency is between 0.5 to 2 (kHz). Alternatively, instead of using the digital filter, moving average process, trend model process, and any other suitable processes may be used as the smoothing processing.

Figure 8C:
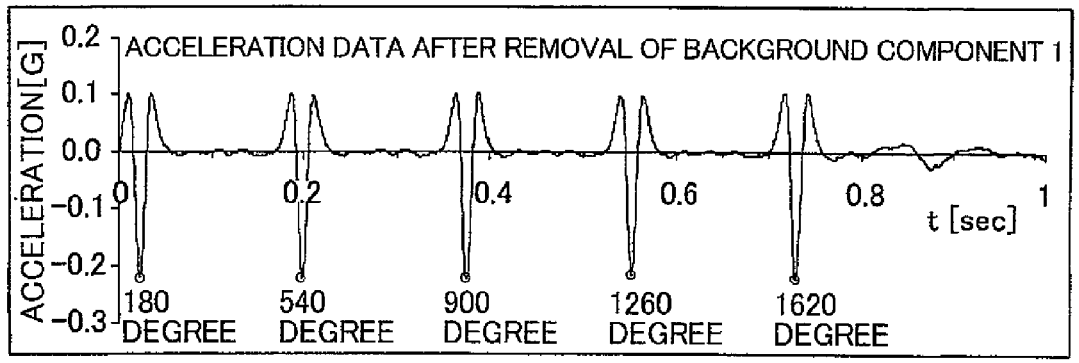

Then, in the signal processing section 24, a background component 1 of low frequency is removed from the acceleration measurement data which has been subjected to smoothing process (Step S106). The background component 1 of acceleration in the radial direction includes effects from acceleration components of the centrifugal force (centripetal force) during tire rotation and acceleration components of the gravitational force (note that those components are also included in the background component of acceleration in the width direction). In FIG. 8(b), the waveform of the background component 1 is indicated. The low frequency component is extracted by performing smoothing process further on the waveform data obtained in Step S104, which has been subjected to smoothing process. For example, a digital filter that assumes a certain frequency as a cut-off frequency may be used. For example, if the rotation speed is 60 (km/h), the cut-off frequency is between 0.5 and 2 (kHz). Alternatively, instead of using the digital filter, moving average process, trend model process, and other suitable processes may be used as the smoothing processing. The background component is also extracted by calculating a first approximation curve by means of least squares method by providing a plurality of nodes in the waveform data of the smoothed data, for example, at a predetermined time interval. Predetermined functional groups such as third-order spline functions may be used as the approximation curve. Note that the nodes denote constraint conditions on the horizontal axis that provide local curvatures (jog) of the spline functions. In the signal processing section 24, the background component 1 thus extracted is subtracted from the measurement data of acceleration subjected to smoothing process in Step S104, so the acceleration components due to tire rotation and the acceleration components of the gravitational force are removed from the measurement data (measurement data of acceleration in the tire radial direction). FIG. 8(c) shows the time series data of acceleration after the removal of background component. In this manner, the acceleration components due to contact deformation of the tire tread portion (radial direction deformation acceleration data) can be extracted.

The signal processing section 24 further extracts, from the time series data of acceleration due to tire deformation thus obtained, timings when the above-mentioned rotation angle θ is 180 degree, 540 degree, 900 degree, or the like (Step S108). In the signal processing section 24, the timings at which the acceleration due to tire deformation takes minimum value in the graph of the time series data of acceleration due to tire deformation, are extracted as the timing when the rotation angle θ is 180 degree, 540 degree, 900 degree, or the like. In other words, as shown in FIG. 2, the timings of the minimum value are extracted as the timings when the acceleration sensor 2 fixed on the inner circumference surface in the tire cavity region comes to the center position of (nearest to) the contact portion of the tire. In the contact portion of the tire, the positions on the outer circumference surface in a direction perpendicular to the road surface are determined by the road surface. In the contact portion, the road surface deforms the tire outer circumference surface originally having a curvature into a plane-like shape, thus causing the tire to deform in a tire thickness direction. Therefore, the positions on the inner circumference surface of the tire cavity region is displaced in the tire thickness direction (direction perpendicular to the road surface) by a certain amount. Acceleration of deformation in the tire thickness direction reduces most at the center position of the contact portion. It is assumed that the timings when the acceleration due to tire deformation acquired by the acceleration sensor arranged on the inner circumference surface becomes minimum are the timing when the above-mentioned rotation angle is 180 degree, 540 degree, 900 degree, or the like. Each of the processes in Steps S104 to 108 is performed on the measurement data of acceleration obtained for each of the wheels 14a to 14d in the Step S102.

Figure 9A:
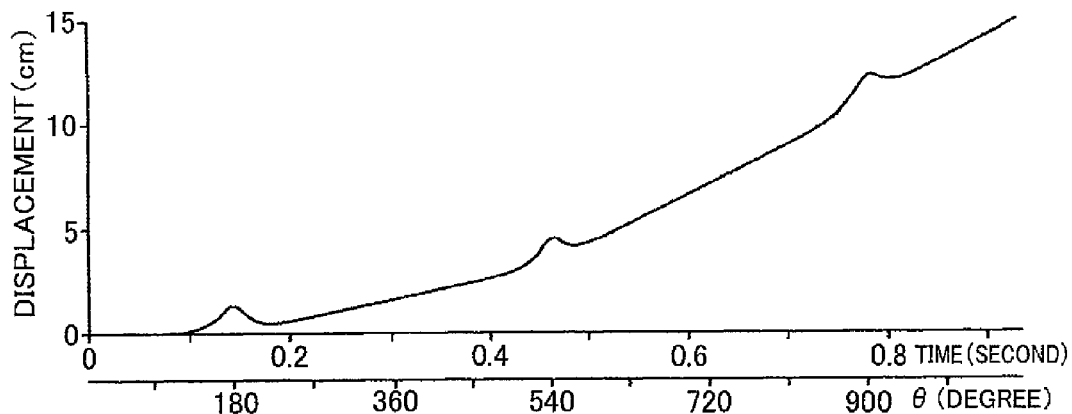
FIGS. 9(a) to 9(c) are graphs showing signal waveforms obtained by the cornering force calculating method according to the present invention.
Figure 9B:
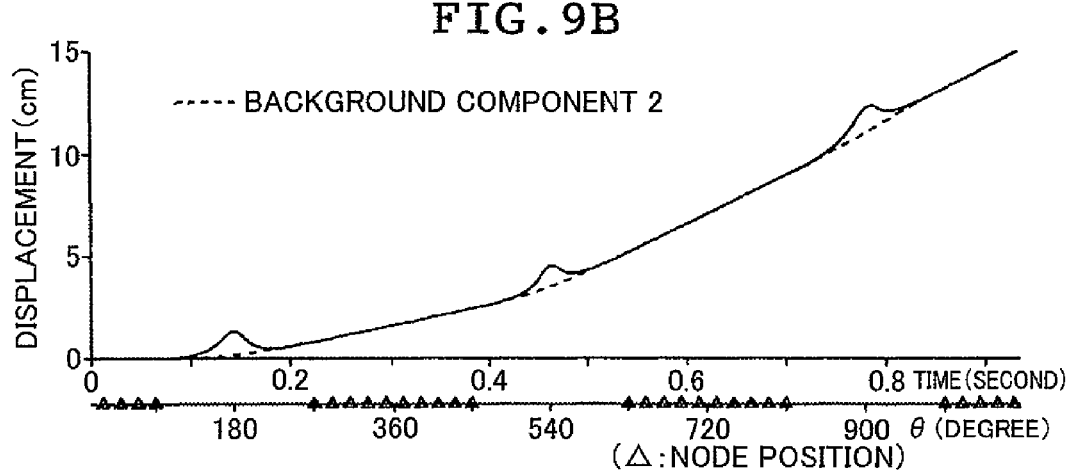
Figure 9C:
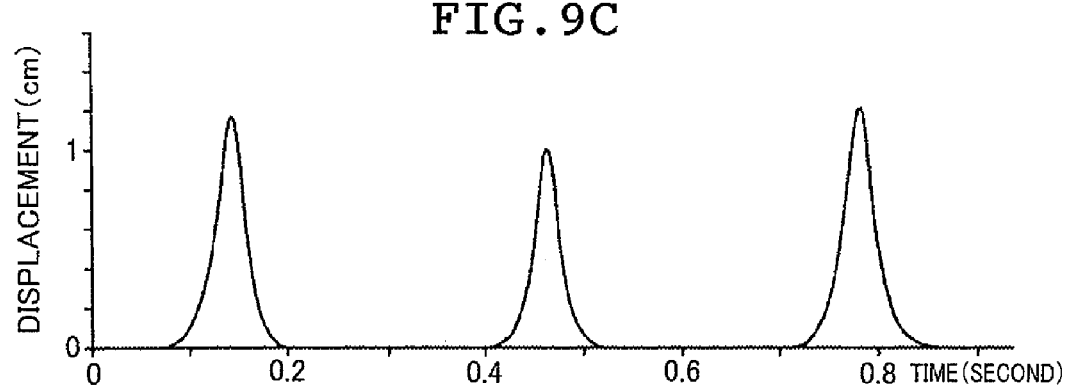

Next, by using the processing result obtained in the signal processing unit 24, the contact length deriving section 40 calculates the contact lengths $CL_a$ to $CL_d$ each corresponding to the wheels 14a to 14d (tires 15a to 15d), respectively, of the vehicle 12 which is cornering. First, the contact length deriving section 40 calculates, based on the radial direction deformation acceleration data, a distribution of the amount of deformation in the tire radial direction due to the contact deformation of the tread portion (Step 110). FIGS. 9(a) to 9(c) are graphs each schematically showing a processing result obtained in the contact length deriving section 40 in Step S110. The contact length deriving section 40 first subjects the radial direction deformation acceleration data (time series data of acceleration due to contact deformation) to time integration of second order, to thereby create displacement data. FIG. 9(a) shows a result obtained by subjecting the time series data of acceleration, from which the background component 1 is removed in the data processing unit, to integration of second order with respect to time. As shown in FIG. 9(a), the displacement increases with time, which is because the time series data of acceleration which is to be subjected to the integration includes noise components, which are accumulated through the integration. In general, when the amount of deformation or a displacement at a point of the tread portion of a tire which is rotating in a steady state is observed, the amount of deformation or the displacement periodically changes according to the rotational period of the tire. Therefore, it is generally unlikely that the displacement increases with time.

Here, in order to allow the displacement data obtained through time integration of second order to demonstrate cyclical changes with the tire rotation cycle as a unit, the following processes are carried out on the displacement data.

In other words, noise components contained in the displacement data are calculated as the background component 2 in a similar manner as used for calculating the background component 1. In this case, by using the above-mentioned time series rotation angle, which is obtained when the deformation acceleration data in the radial direction is derived, the amount of deformation of the tire during rotation in a region including the contact portion with the road surface can be obtained with accuracy. Specifically, a region of the tire circumference is divided into a first region including the contact portion in contact with a road surface and a second region including other than the first region. The regions which are defined as the first region include a region having a θ of greater than 90 degree and less than 270 degree, a region having a θ of greater than 450 degree and less than 720 degree, and a region having a θ of greater than 810 degree and less than 980 degree. Further, the regions that are defined as the second region include a region having a θ of equal to or greater than 0 degree and equal to or less than 90 degree, and equal to or greater than 270 degree and equal to or less than 360 degree; a region having a θ of equal to or greater than 360 degree and equal to or less than 450 degree, and equal to or greater than 630 degree and equal to or less than 720 degree; and a region having a θ of equal to or greater than 720 degree and equal to or less than 810 degree, and equal to or greater than 990 degree and equal to or less than 1,080 degree. The background component 2 is obtained by using a plurality of positions (θ or time corresponding to θ) on the circumference in the second region as nodes so as to calculate a second approximation curve on the data in the first and second regions through least squares method using a set of predetermined functions. The nodes denote constraint conditions on the horizontal axis that provide local curvatures (jog) of the spline functions. FIG. 9(b) shows the second approximation curve representing the background component 2 with a dotted line. In the example shown in FIG. 9(b), the positions as indicated by "Δ" in FIG. 9(b), that is, the positions of time where θ is 10 degree, 30 degree, 50 degree, 70 degree, 90 degree, 270 degree, 290 degree, 310 degree, 330 degree, 350 degree, 370 degree, 390 degree, 410 degree, 430 degree, 450 degree, 630 degree, 650 degree, 670 degree, 690 degree, 710 degree, 730 degree, 750 degree, 770 degree, 790 degree, 810 degree, 990 degree, 1,010 degree, 1,030 degree, 1,050 degree, and 1,070 degree are defined as the node positions.

By carrying out function approximation on the displacement data shown in FIG. 9(a) with the third-order spline functions constrained by the above-mentioned nodes, a approximation curve as indicated by a dotted line in FIG. 9(b) is calculated. When carrying out function approximation, there are no nodes in the first region, and only the plurality of nodes in the second region are used. In least squares method that is carried out in conjunction with the function approximation, the weighting coefficient for the second region is set to 1, and the weighting coefficient for the first region is set to 0.01. The reason why the weighting coefficient for the first region is smaller than the weighting coefficient for the second region, and no nodes are set in the first region in calculating the background component 2, is to calculate the background component 2 by mainly using the displacement data in the second region. In the second region, because contact deformation of the tread portion is small and such deformation changes smoothly on the circumference, the amount of tire deformation (amount of tire radial direction deformation, and amount of tire width direction deformation) is small on the circumference and such changes are also extremely small. In contrast, in the first region, the tire tread portion is greatly displaced based on contact deformation and changes rapidly. For this reason, the amount of deformation (amount of tire radial direction deformation, and amount of tire width direction deformation) based on contact deformation is great on the circumference and changes rapidly. In other words, the amount of deformation of the tread portion in the second region is substantially constant as compared to the amount of deformation in the first region. Accordingly, by calculating the approximation curve mainly using the displacement data obtained in the second regions through integration of second order, the amount of deformation of the rotating tire can be obtained accurately, not only in the second region, but also in the first region including the contact portion with the road surface. FIG. 9(b) shows the second approximation curve calculated mainly using the displacement data in the second region with a dotted line. In the second region, the second approximation curve substantially matches the displacement data (solid line).

Then, the approximation curve calculated as the background component 2 is subtracted from the displacement data, to thereby calculate the distribution of an amount of deformation on the circumference based on the contact deformation of the tread portion. FIG. 9(c) shows a distribution of an amount of deformation due to the contact deformation of the tread portion, which is calculated by subtracting the second approximation curve (dotted line) from the displacement signal (solid line) shown in FIG. 9(b). FIG. 9(c) shows a distribution of an amount of deformation in the tire radial direction during three rotation of the tire (the tire comes into contact with a road surface three times), when a predetermined portion (sensor position) on the tread portion rotates on the circumference to be deformed. As shown in FIG. 9(c), the amount of deformation changes at each contact. The amount of deformation, which is calculated by the above-mentioned method, accurately matches the amount of deformation obtained through a simulation using finite element models of the tire.

Then, the contact length is calculated in the contact length deriving section 40 (Step S112). First, the time series data of an amount of deformation of the tread portion shown in FIG. 9(c) is subjected to differentiation of second order with respect to time, to thereby obtain time series data of acceleration corresponding to the amount of deformation of the tread portion, which is equivalent to the acceleration including no noise component as shown in FIG. 8(c), that is, time series data of acceleration based on the contact deformation of the tread portion, which does not include noise components.

Figure 10A:
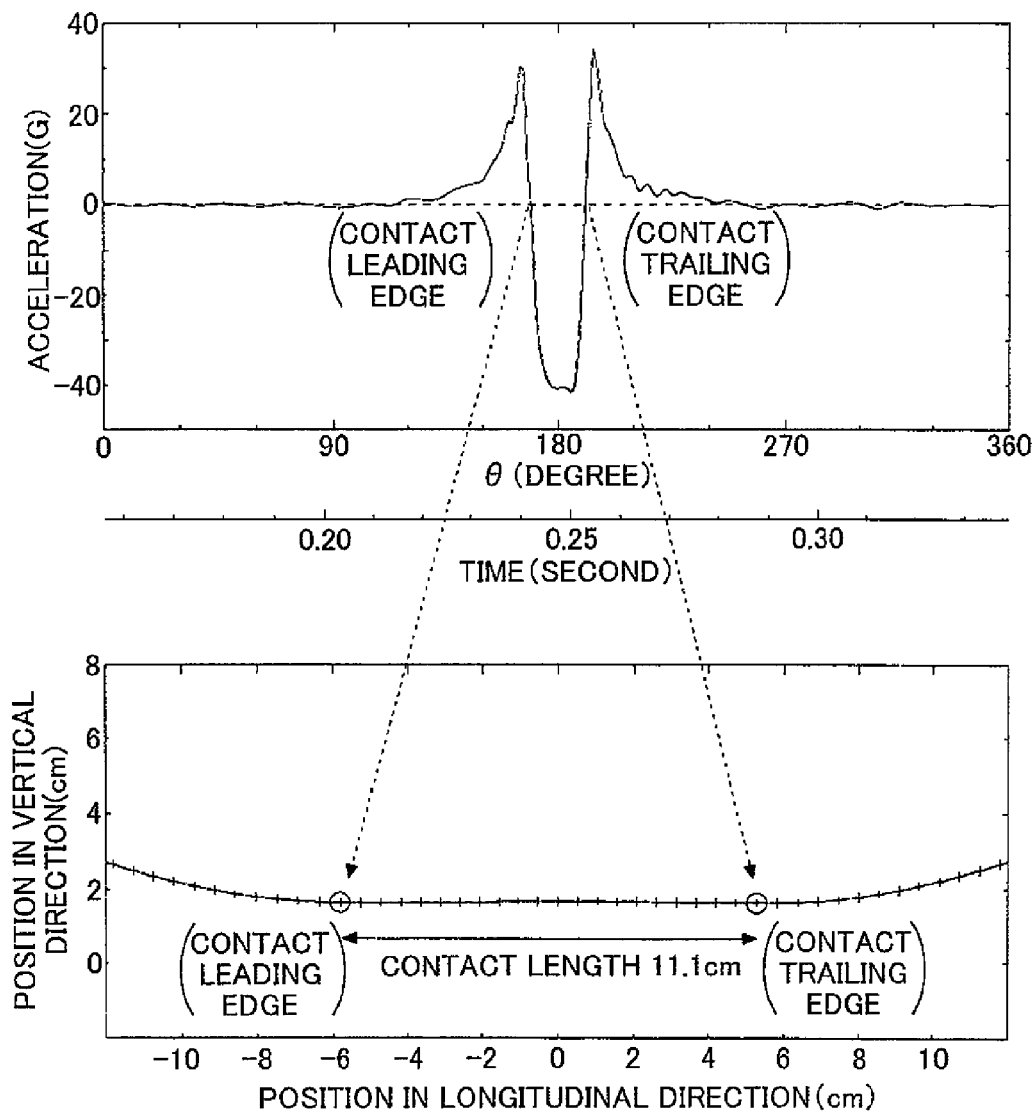
FIGS. 10(a) and 10(b) are charts explaining a method of calculating a contact length performed in the cornering force calculating method according to the present invention.

FIG. 10(a) illustrates a method of obtaining a contact portion and a contact length. First, two points are determined in the time series data of acceleration extracted in Step S110, at each of which acceleration crosses 0 with a sharp change. The time series data of acceleration is the data due to the contact deformation of the tire tread portion, and does not include noise components. Next, positions in the displacement data which correspond to the two points obtained as described above, and the positions are each defined as a position of a contact leading edge and a position of a contact trailing edge, as shown in FIG. 10(a). The reason why the positions at which the time series data of acceleration changes sharply can be determined as the contact leading edge and the contact trailing edge, is that the tire is deformed rapidly each time when the tread portion rotates to enter the contact portion and exit the contact portion. Further, it is possible to clearly determine the positions at which the time series data of acceleration crosses 0.

The lower graph in FIG. 10(a) shows the deformation shape of the tire deformed due to contact. The graph is obtained by converting a polar coordinate system, which is based on the tire radial direction and the tire circumferential direction, into an orthogonal coordinate system, which is based on the tire vertical direction and the tire longitudinal direction. The positions of the contact leading edge and the contact trailing edge are determined on the graph, to thereby evaluate the contact length. The contact length calculated by the method as described above accurately matches the contact length obtained through a simulation using finite element models of the tire.

Figure 10B:
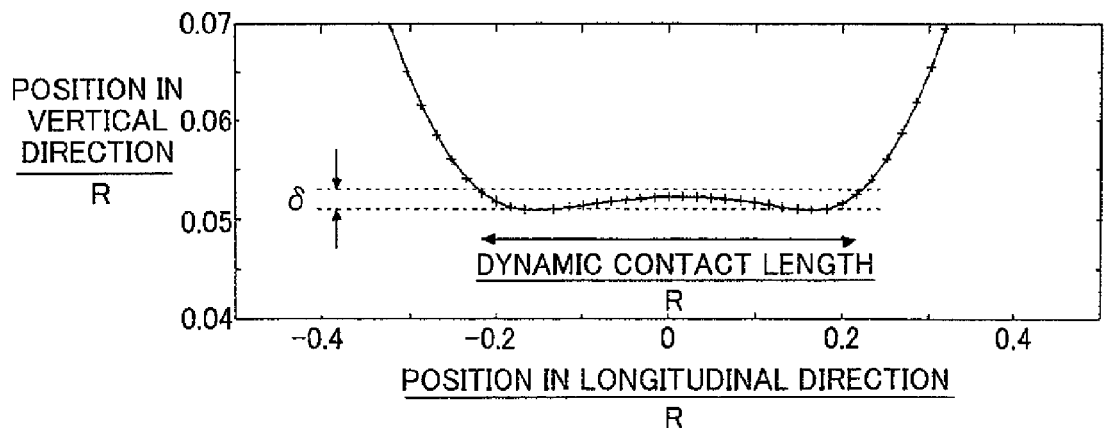

Further, instead of using the method shown in FIG. 10(a), a method shown in FIG. 10(b) may be used to obtain the contact portion and the contact length. Specifically, FIG. 10(b) is a graph showing the deformation shape of the tire, in which, when the position of the center of the tire contact is defined as the origin, the positions in the tire longitudinal direction are normalized by dividing each of the positions by an outer diameter R of the tire tread portion, and the positions in the tire vertical direction are normalized by dividing each of the positions by the outer diameter R. As shown in FIG. 10(b), the positions at which the tire deformation shape crosses a linear line that is upwardly away by a predetermined distance δ from the lowest point in the vertical direction are defined as normalized positions each corresponding to the contact leading edge and the contact trailing edge, respectively. The normalized positions are obtained respectively and then multiplied by the outer diameter R, to thereby obtain the positions of the contact leading edge and the contact trailing edge, thus allowing the contact portion and the contact length of the tire to be obtained. The predetermined distance δ used in defining the leading edge position and the trailing edge position of the contact portion may, for example, preferably be within a range of 0.001 to 0.005. Alternatively, the positions at which a square value of a distance of the tread portion upwardly away from the lowest point crosses a predetermined value may be assumed as the contact leading edge and the contact trailing edge. In this case, the predetermined value falls within, for example, a range of 0.00002 (cm$^2$) to 0.00005 (cm$^2$), and is preferably 0.00004 (cm$^2$). A significantly high correlation has been observed between the measurement result obtained through extensive measurement of the contact length under various loads applied to a stationary tire and the result of the contact length obtained in the above-mentioned method.

Figure 11:
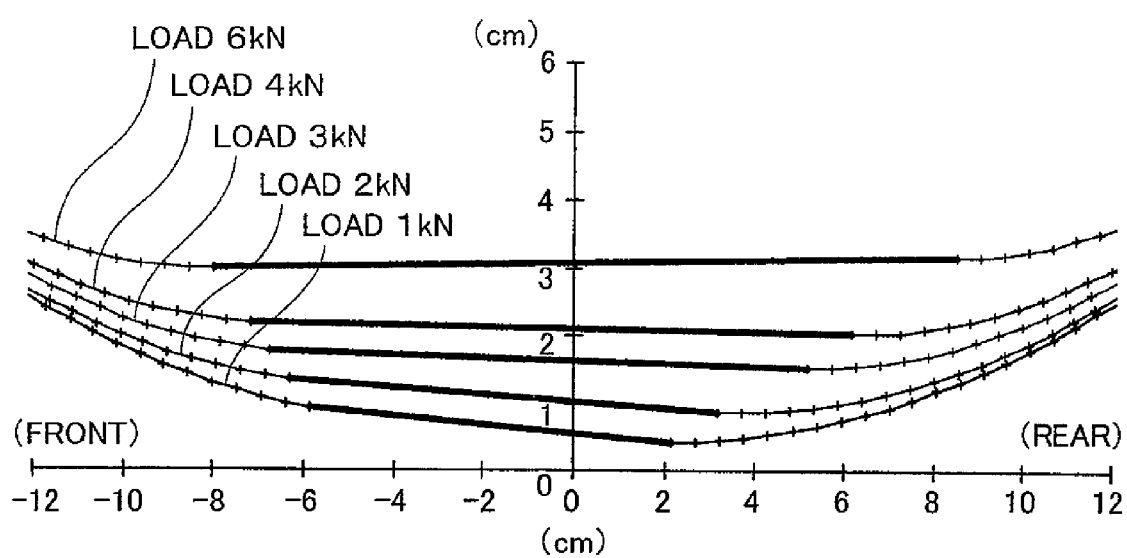
FIG. 11 is a chart showing examples of contact lengths calculated by the cornering force calculating method according to the present invention.

FIG. 11 shows examples of the contact portion and the contact length obtained by the above-mentioned method. In FIG. 11, thick lines each indicate the contact portion.

The contact length of each of the wheels 14a to 14d is derived as described above.

Along with the derivation of the contact length of each of the wheels 14a to 14d, the signal processing unit 24 executes each of the processes in Steps S204 to S208 by using the acceleration data in the tire width direction. The acceleration data in the tire width direction is obtained by the acceleration sensor 2, together with the acceleration data in the tire radial direction which has been used for deriving the contact length (Step S202). Each of the processes in Steps S204 to Step 208 is executed similarly to Steps S102 to S108 described above, except in that the acceleration data in the tire width direction is used instead of using the acceleration data in the tire radial direction. As described above, an amount of deformation in the tire width direction at the contact portion of the tire reaches its maximum in the vicinity of the center position of the contact portion of the tire (see FIG. 3(b)). Accordingly, the contact center timing, which has been derived through the processes (Steps S204 to S208) performed similarly to Steps S102 to S108 described above, substantially matches the contact center timing obtained in Step S108. Then, the width direction deformation deviation deriving section 50 performs the process similar to Step S110 described above, to thereby calculate the amount of tire width direction deformation at the tire contact portion for each of the tires 15a to 15d of the wheels 14a to 14d (Step S210). Then, by using the amount of width direction deformation of each wheel during the straight travel of the vehicle 12 (in the case where the slip angle SA is 0°), which has been stored in the memory 27 in advance, the width direction deformation deviation with respect to the calculated amount of width direction deformation of each wheel (a difference with respect to the amount of width direction deformation obtained in the case where the slip angle SA is 0°) is derived (Step S212).

Also, along with the derivation of the contact length and the width direction deformation deviation of each of the wheels 14a to 14d, the centrifugal force deriving section 60 receives, from the G sensor 18, the acceleration data at the vehicle body center position obtained by the G sensor 18 (Step S302), and derives a magnitude of a centrifugal force applied to the vehicle 12 during cornering, by using the time series data of acceleration at the body center position of the vehicle 12 and the information on weight (mass weight) of the vehicle 12 stored in advance in the memory 27 (Step S312).

Then, the cornering force deriving section 70 receives information on the contact length of each wheel derived in Step S112, the width direction deformation deviation of each wheel derived in Step S212, and the magnitude of centrifugal force to be applied to the vehicle 12 derived in Step S312, and calculates, for each wheel, a magnitude of a cornering force generated at the contact surface of each of the wheels 14a to 14d, by using the above-mentioned expressions (1-1) to (1-4) (Step S400). Then, the calculated values of the cornering forces generated in the wheels are output to be displayed on the display 34 (Step S402). The calculation of the cornering force is performed as described above in the device 10.

In the practice of the present invention, by providing a plurality of acceleration sensors on the inner circumference surface of the tread portion, circumferentially, contact states at a plurality of positions on the circumference of the tread portion can be obtained simultaneously. In addition, providing a plurality of acceleration sensors in the tire width direction enables the obtaining of the contact length and the distribution of the contact regions in the width direction, so the contact shape of the rotating tire can be acquired. Also, providing a plurality of acceleration sensors on the inner circumference surface of the tread portion, circumferentially, as described above, enables the acquisition of the distribution of the side force, which is generated on the contact region of the tread portion, in the tire circumferential direction. Providing a plurality of acceleration sensors in the tire width direction enables the obtaining of the distribution in the tire width direction of the cornering force generated in the contact region of the tire.

While the tire side force evaluating method and the tire side force evaluating method of the present invention have been described thus far in detail, it should be understood that the present invention is not limited to the above embodiments, and rather covers all modifications equivalents, and alternatives without departing from the spirit of the invention.

The invention claimed is:

1. A computer-implemented method of calculating a magnitude of a cornering force applied to each of a plurality of wheels of a vehicle when the vehicle is cornering, each of the plurality of wheels comprising a tire, and being implemented by a computer programmed to carry out the method steps, the method comprising:

measuring, with an electronic device, a magnitude of a centrifugal force applied to the vehicle when the vehicle is cornering, the centrifugal force being in a direction substantially orthogonal to a vehicle traveling direction;

determining, with a computer, a contact length in a wheel circumferential direction, at a contact portion of each of the plurality of wheels when the vehicle is cornering;

determining, with the computer, an amount of deformation in a wheel width direction when the vehicle is cornering, at the contact portion of each of the plurality of wheels; and calculating, with the computer, a magnitude of a cornering force applied to each of the plurality of wheels, based on the magnitude of the centrifugal force measured with the electronics device, the contact length, and the amount of the deformation in the wheel width direction when the vehicle is cornering.

2. The computer-implemented method according to claim 1, further comprising calculating, with the computer, prior to the calculating of the magnitude of the cornering force, a difference between the amount of the deformation in the wheel width direction when the vehicle is cornering and an amount of deformation in the wheel width direction when the vehicle is traveling straight, for each of the plurality of wheels, wherein:

the amount of the deformation in the wheel width direction when the vehicle is traveling straight is determined in advance; and the calculating of the magnitude of the cornering force comprises calculating, with the computer, a magnitude of a cornering force generated in each of the plurality of wheels, respectively, by using the magnitude of the centrifugal force, the contact length, and the difference between the amounts of the deformation in the wheel width direction.

3. The computer-implemented method according to claim 2, wherein the calculating of the magnitude of the cornering force comprises:

determining, with the computer, for each of the plurality of wheels, a deformation area equivalent indicating a deformation area of the contact portion of each of the plurality of wheels during when the vehicle is cornering, the deformation area equivalent being obtained by multiplying the contact length with the difference of the amounts of the deformation in the wheel width direction; and multiplying each ratio of the deformation area equivalent of each of the plurality of wheels with respect to a sum of the deformation area equivalents of the plurality of wheels, with the magnitude of the centrifugal force to calculate, for each of the plurality of wheels, a magnitude of a cornering force generated in the contact portion of each of the plurality of wheels.

4. The computer-implemented method according to claim 1, further comprising acquiring, with an electrical device, time series acceleration data at a predetermined portion of the tire, the time series acceleration data being generated due to an external force applied from the road surface to the tire in rotation, wherein the determining of the contact length comprises using the time series acceleration data.

5. The computer-implemented method according to claim 4, wherein the determining of the contact length comprises:

determining, with the computer, displacement data by extracting, from the time series acceleration data, time series acceleration data due to deformation of a tire and by subjecting the time series acceleration data due to deformation of a tire to time integration of second order, to calculate an amount of deformation at a predetermined portion of the tire; and calculating, with the computer, the contact length, by using the amount of deformation at the predetermined portion of the tire.

6. The computer-implemented method according to claim 4, wherein:

the time series acceleration data includes acceleration data in a radial direction which is orthogonal to a circumferential direction of the tire; and the amount of deformation at the predetermined portion of the tire includes an amount of deformation in the radial direction of the tire.

7. The computer-implemented method according to claim 1, further comprising acquiring time series acceleration data in the wheel width direction at a predetermined portion of the tire, the time series acceleration data being generated due to an external force applied from the road surface to the tire in rotation,
wherein
the determining of the amount of deformation in the wheel width direction comprises using the time series acceleration data of the tire.

8. The computer-implemented method according to claim 7, wherein the determining of the amount of deformation in the wheel width direction comprises:
determining, with the computer, displacement data by extracting, from the time series acceleration data, time series acceleration data due to deformation of a tire and by subjecting the time series acceleration data due to deformation of a tire to time integration of second order, to calculate the amount of the deformation in the wheel width direction of the tire.

9. The computer-implemented method according to claim 1, further comprising measuring, through a vehicle acceleration sensor, a magnitude of acceleration of the vehicle in a direction substantially orthogonal to the vehicle travelling direction during when the vehicle is cornering,
wherein the magnitude of the centrifugal force is based on the measured magnitude of acceleration of the vehicle and a weight of the vehicle which is determined in advance.

10. A cornering force calculating device for calculating a magnitude of a cornering force to be applied to each of a plurality of wheels provided to a vehicle when the vehicle is cornering, the plurality of wheels being each assembled with a tire, the cornering force calculating device comprising:
a centrifugal force measuring means for measuring a magnitude of a centrifugal force to be applied to the vehicle which is cornering, the centrifugal force being in a direction substantially orthogonal to a vehicle traveling direction;
a contact length deriving means for determining a contact length in a wheel circumferential direction, at a contact portion of each of the plurality of wheels of the vehicle which is cornering;
a width direction deformation amount deriving means for determining an amount of deformation in a wheel width direction, at the contact portion of each of the plurality of wheels of the vehicle which is cornering; and
a cornering force calculating means for calculating a magnitude of a cornering force generated in each of the plurality of wheels provided to the vehicle, based on the measured magnitude of the centrifugal force, the derived contact length, and the amount of the deformation in the wheel width direction.

11. A cornering force calculating device for calculating a magnitude of a cornering force applied to each of a plurality of wheels of a vehicle when the vehicle is cornering, each of the plurality of wheels comprising a tire, the cornering force calculating device comprising:
a sensor configured to measure a magnitude of a centrifugal force applied to the vehicle when the vehicle is cornering, the centrifugal force being in a direction substantially orthogonal to a vehicle traveling direction; and
a processor configured to
determine a contact length in a wheel circumferential direction, at a contact portion of each of the plurality of wheels when the vehicle is cornering,
determine an amount of deformation in a wheel width direction when the vehicle is cornering, at the contact portion of each of the plurality of wheels, and
calculate a magnitude of a cornering force applied to each of the plurality of wheels provided to the vehicle, based on the measured magnitude of the centrifugal force, the derived contact length, and the amount of the deformation in the wheel width direction when the vehicle is cornering.

* * * * *